June 29, 1937.    R. G. GUTHRIE    2,085,313
METHOD OF FORMING HOLLOW VESSELS
Filed Jan. 15, 1935
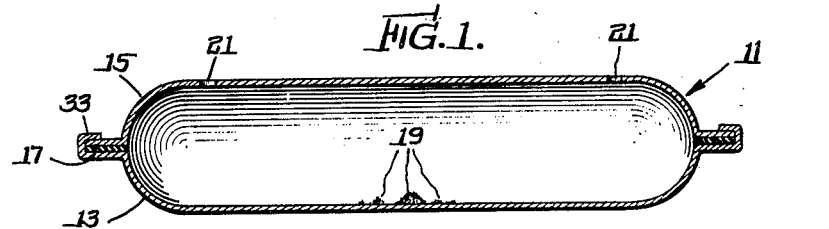
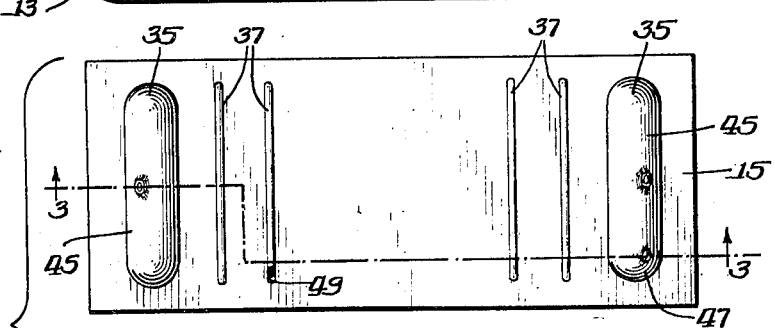
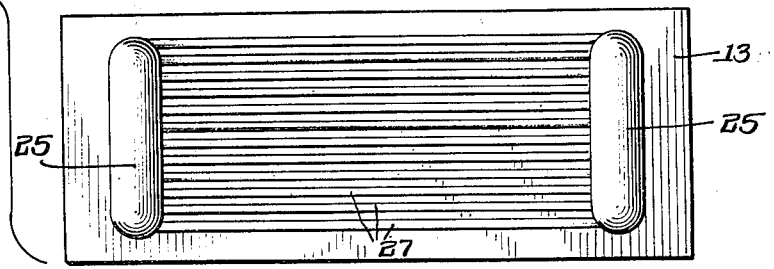
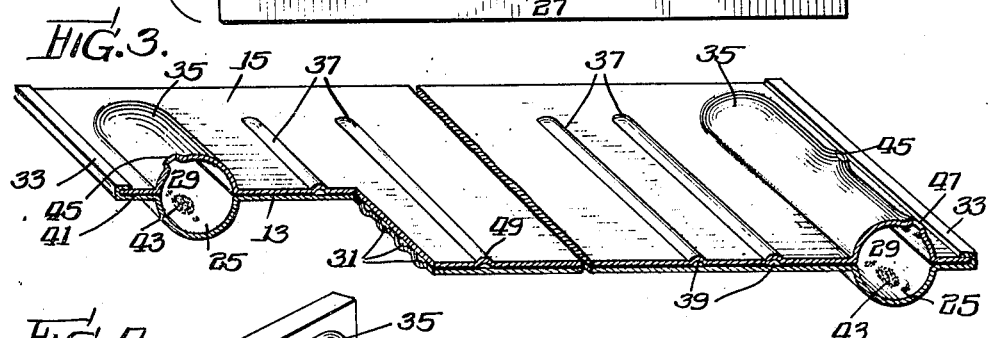
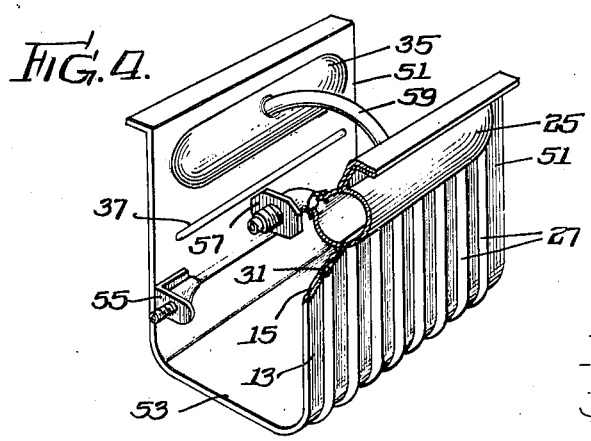
Inventor:
Robert G. Guthrie
By: Cox + Moore attys.

Patented June 29, 1937

2,085,313

UNITED STATES PATENT OFFICE 2,085,313

METHOD OF FORMING HOLLOW VESSELS

Robert G. Guthrie, Chicago, Ill., assignor, by mesne assignments, to Reconstruction Finance Corporation, Chicago, Ill., a corporation Application January 15, 1935, Serial No. 1,918

12 Claims. (Cl. 113—112)

My invention relates in general to the joining of materials and particularly to brazing sheet metal parts in making shell-like housings, such as, for example, evaporator units for refrigerators.

The invention has, for an important object, the provision of an improved brazing method or technique, particularly as applied in the fabrication of hollow vessels formed by securing sheet metal parts together, whereby imperfections in brazed sheet metal seams, due to oxidation, are substantially prevented without necessitating expensive equipment to ensure that the brazing is accomplished in a reducing atmosphere.

Another important object is to employ, during brazing operations, a substance adapted to evaporate at brazing temperatures and generate, in the vicinity of the braze, an atmosphere compatible with successful brazing operations, and to the complete exclusion of media detrimental to brazing.

A further important object is to employ, during brazing operations on hollow vessels, a substance adapted to generate, at brazing temperatures, a gaseous atmosphere sufficient to fill the vessel completely, and to the exclusion of gaseous media detrimental to brazing, with an atmosphere adapted to promote successful brazing operations.

Still another object is to utilize a metal, readily evaporable at brazing temperature, to develop vapors adapted to inhibit oxidation at and in the vicinity of the braze; a further object being to utilize zinc for this purpose.

A still further object is to regulate the pressure, developed in a hollow vessel as a result of evaporation of an oxidation inhibiting substance therein during brazing operations, by providing for the restricted escape, from the vessel, of vapors developed therein in excess of oxidation inhibiting requirements.

Yet another object resides in providing an improved shell-like structure having brazed seams made in accordance with my improved anti-oxide process.

Numerous other objects, advantages, and inherent functions of the invention will become apparent as the same is more fully understood from the following description, which, taken with the accompanying drawing, discloses a preferred mode of practicing the invention as well as an example of a product of the same.

Referring to the drawing:

Figure 1 is a sectional view taken through a hollow vessel comprising sheet metal pieces as assembled ready for brazing in accordance with the teachings of my present invention; and Figures 2, 3, and 4 show sheet metal parts of as well as a finished evaporator comprising a hollow vessel made from the parts by applying my improved technique.

To illustrate my invention, I have shown a hollow vessel 11 comprising configurated sheet metal parts 13 and 15 secured together by brazing, that is to say, by causing the material of the parts, at their abutting portions, to become integrated as by heating to cause the material to form solid solution one with the other or both with an intermediate brazing material.

The mechanical strength and leak-proof qualities of a joint or seam made in this fashion are or may be seriously impaired if oxidation of the parts occurs at the joint during the formation of the same. I obviate the danger of joint impairment by developing and applying at the joint a vaporous blanket comprising an atmosphere which will not hinder or hamper the formation of the braze but which will prevent access of any oxidizing agency, such as air, to the parts being joined during the progress of the brazing operation.

For this purpose, I may employ any suitable material capable of developing an anti-oxide blanket under brazing conditions. I prefer, however, to employ zinc which readily vaporizes at a rapid rate at brazing temperatures and will generate, in large quantities, compared with its volume before evaporation, zinc vapor in sufficient concentration to blanket the parts being joined and inhibit the oxidation of the same. Zinc vapor, however, does not interfere with the orderly formation of the braze.

The metal parts 13 and 15 to be connected may be assembled together with a suitable brazing medium 17 interposed between the abutting portions to be joined. The brazing medium may be copper, or a cuprous alloy, such as bronze or brass, or other suitable brazing material adapted, when heated, to unite with the material of the parts 13 and 15 and I may develop the gaseous anti-oxide blanket from a suitable material incorporated in the brazing material 17 as by using a brazing material comprising an alloy excessively rich in zinc, which, when the brazing material is heated to brazing temperature, will be vaporized out of the material and produce a protective blanket of zinc vapor at and around the joint.

I prefer, however, not to rely upon zinc vapor evolved from the brazing material, even when the same contains substantial quantities of evaporable zinc but to deposit, in the interior of the shell being brazed, a quantity of free zinc 19, preferably in the form of powder or pellets of the pure metal. The purity of the metal is, of course, relative but the material should at least contain no impurities which, when vaporized, might effect the brazing operation.

As soon as the shell is heated above the vaporizing temperature of the blanket forming medium 19, which temperature is, of course, below the temperature necessary to fuse the brazing material 17 and accomplish the braze, the material 19 will evaporate and develop quantities of vapor within the shell 11. Enough of the medium 19 is used, depending, of course, upon the size of the shell, to ensure the liberation of enough vapor in the chamber to exclude entrance of atmospheres capable of impairing the braze either through the joint or through any openings in the chamber walls.

Zinc and other media, which may be used for the purpose of excluding deleterious gases from the braze, of course, when vaporized, develop gases in volume many times that of the initial volume of the material deposited in the shell. Consequently, it is desirable to have one or more vent openings 21, through which the excess gases may escape in order to relieve gas pressure within the shell; otherwise the accumulation of gas within the shell may destroy the brazed seal by blowing out the brazing material 17 while the same is in molten condition during the formation of the braze. These openings may be of restricted size in order to prevent the too rapid escape of the gases and to hinder entrance of gases injurious to the brazing process. The size of the openings is not, however, critical and brazing may be performed on shells having relatively large openings providing, of course, that enough of the gas-producing medium 19 is employed to ensure against entrance of undesired gases into the shell.

The invention may, of course, be utilized to advantage in any brazing operation performed upon articles susceptible to the entrapment of the blanketing gases at and in the vicinity of the braze. I find, however, that my new brazing technique is particularly well suited to the fabrication of sealed vessels of the type adapted for use as evaporators in refrigeration systems, and, in Figures 2, 3, and 4, I have illustrated parts of, as well as a complete, evaporator 11, which may be fabricated by sealing together, by my improved brazing technique, preferably sheet metal pieces 13 and 15, to form a vessel comprising an evaporator space defined by and between the pieces.

The pieces 13 and 15, of course, may be configurated to any suitable or preferred shape in any convenient fashion as, for instance, by pressing in a die. Preferably one of the sheets is formed with spaced depressions 25 near the opposite end edges of the sheet, and one of the sheets is provided with a series of parallel duct-forming grooves 27 so that when the sheets are fastened together, the depressions and grooves form spaced header chambers 29 interconnected by a plurality of parallel ducts 31. The depressions 25 and the grooves 27 are preferably formed in the sheet 13 and the other sheet 15 is assembled in position to overlie the depressions 25 and grooves 27, the sheets being secured together as by curling the edge of one sheet about the edge of the other, as shown at 33, and by sealing the peripheral edges of the sheets and between the grooves 27 to form a closed refrigerant space defined, between the plates, by the header-forming depressions and interconnecting grooves.

The sheet 15, also, is preferably formed with depressions 35 in position respectively opposite the depressions 25 so that the depressions 25 cooperate, in the evaporator unit, respectively, with the depressions 35 to form the elongated cylindrical header chambers 29. One of the sheets, preferably the sheet 15, is also formed at intervals with depressions or grooves 37 forming ducts 39 intersecting and communicating with the ducts 31.

The formed plates 13 and 15 are assembled in facing relationship with a layer of a suitable brazing medium 41, such as copper, brass, or the like, interposed between the adjacent surfaces of the plates which are to be secured together. A suitable material 43, such as zinc, is disposed in the refrigerant space defined between the assembled plates, the material 43 being preferably arranged in the header portions 29. The assembly then is heated, as by placing the same in a suitable furnace, in order to form, between facing surfaces of the plates 13 and 15, a solution comprising the material of the plates and the material of the layer 43.

In order to bring these materials into solution, it is necessary to apply sufficient heat to cause the material 41, and/or the material at the facing surfaces of the plates being joined, to melt so that the bonding solution may be formed by and between the facing surfaces of said plates.

The bonding solution, of course, will freeze between the plates and integrate said parts as soon as the temperature, at which the braze is formed, is reduced. The material 43, however, during the application of brazing heat to the blank, will evaporate and produce a gaseous atmosphere within the header portions 29, which atmosphere will penetrate between the facing surfaces being joined as well as into the ducts 31 and 39 so that the entire refrigerant space, between the plates, is filled with gases, adapted to inhibit oxidation of the parts being joined, to the absolute exclusion of media capable of injuriously affecting the joint as by oxidation during the formation of the same.

The gases thus developed in the refrigerant space not only blanket the parts, between which the joint is formed, but also may penetrate between the surfaces being joined in order to prevent entrance of deleterious media into the joint from its outer edges. Where the medium 43 comprises zinc, the presence of zinc vapor, between the surfaces being joined, will not impair the joint or interfere with the formation of the same, since the zinc may be absorbed by the joint-forming materials so that at least some of the gas may condense in and form a part of the joint.

In order to prevent pressure of the blanketing vapor, developed within the refrigerant space, from becoming excessive, perforations 45 and 47 may be formed in the header-forming portions 35, and an opening 49 formed in the end of at least one of the ridges 37 in order to permit the vapors to escape at a restricted rate so that excessive pressures will not develop within the evaporator. The openings 45, 47, and 49, however, are of such a size that the gases may not escape so quickly as to decrease the blanketing atmosphere within the refrigerant space to a point where deleterious material may enter. It will be appreciated that the perforations 45, 47, and 49 are preferably arranged in the relative positions shown so that the same may be utilized in attaching inlet and outlet fittings in a manner hereinafter more fully described. These perforations may be formed during the pressing operation, which results in the formation of the sheets 13 and 15, and, should the perforations be of such size as to permit the gaseous blanketing medium to escape too rapidly during the sealing process, I may temporarily close one or more of the openings in order to ensure that the refrigerant space at all times contains the blanketing atmosphere in sufficient volume to prevent the entrance of deleterious gases.

After the formed sheets 13 and 15 have been secured together in substantially flat condition, they may be bent to provide a channel-shaped evaporator element having a cross-sectional configuration substantially as shown in Figure 4 of the drawing, and comprising spaced apart side walls 51 and a bottom wall 53, the side walls containing the header chambers, with the refrigerant ducts 31 extending beneath the header spaces in the side walls 51 and in the bottom wall 53. The ridges 37 project inwardly of the facing surfaces of the walls 51, and form pairs of registering ridges on and between which objects to be cooled may be supported. The opposite ends of the sheets 13 and 15 form the upper edges of the spaced walls 51 of the evaporator unit and may be bent to form flanges, which may be perforated to receive supports by which the evaporator is or may be hung or otherwise mounted within the refrigerating chamber.

The evaporator also is provided with an inlet connection for liquid refrigerant, which is preferably positioned to deliver the refrigerant to the evaporator at a point below the header chambers. To this end, I utilize one of the shelf-supporting ridges 37 to form an inlet header. The ridge, so employed as an inlet header, is provided with the opening 49 at one end, and a fitting 55 having a channel is secured to the evaporator with one end of the channel in communication with the header duct defined by said ridge. The fitting is provided with a preferably threaded nipple whereby its channel may be connected with a refrigerant inlet through which liquid refrigerant is delivered from the compressor. The fitting 55 is, of course, firmly sealed on the evaporator to prevent the escape of the refrigerating medium from the system at the point of entry. The inlet fitting also is preferably located entirely within the lateral confines of the evaporator walls in order to eliminate lateral projections.

The evaporator may also be provided with an outlet for evaporated refrigerant which outlet is also located within the lateral confines of the evaporator walls and which preferably comprises a fitting 57 secured in the opening 47, which is formed preferably in the sheet 15 at one end of the header portion 35. The fitting 57 has a channel opening in the header above the normal liquid refrigerant level therein. The fitting is formed with a preferably threaded portion by means of which it may be connected with a refrigerant outlet conduit forming a part of the system, in which the evaporator is used. The outlet fitting 57 may, of course, be connected in either or both of the headers, but I prefer to connect it in one of the header chambers 29, and to interconnect the header chambers by means of a conduit 59 fastened to and between the header forming portions 35 whereby gasified refrigerant collecting in one header chamber may escape through the conduit 59 into the other header and thence, through the outlet fitting. The connecting conduit 59, in addition to its gasified refrigerant conducting function, increases the strength and rigidity of the evaporator by assisting in holding the spaced walls 51 rigidly in spaced relationship. The conduit 59 also provides a convenient handle for carrying the evaporator unit and holding the same in position while it is being assembled in the cabinet.

It is thought that the invention and numerous of its attendant advantages will be understood from the foregoing description and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

Having thus described my invention, what I claim as new and desire to secure by Letters Patent is as follows:

1. The method of forming hollow vessels by joining a plurality of parts, which comprises assembling the parts in vessel-forming position, heating the same to develop a solution at and between adjacently arranged portions thereof whereby to integrate the parts, at said portions, while simultaneously evaporating a medium within said hollow vessel to produce an atmosphere therein at a pressure greater than that prevailing outside of the hollow vessel, said atmosphere being adapted to inhibit oxidation of the material of said parts during the formation of the solution.

2. The method of forming hollow vessels by joining a plurality of parts, which comprises arranging the parts in vessel-forming position, heating the same to develop a solution of the parts at and between adjacently arranged portions thereof whereby to integrate the parts, at said portions, while maintaining, within said vessel, an atmosphere comprising vaporized zinc at a pressure greater than that prevailing outside of the hollow vessel, said atmosphere being adapted to blanket the portion entering the solution and excluding access of oxidizing media thereto during the formation of the solution.

3. The method of forming hollow vessels by joining a plurality of parts, which comprises arranging the parts in vessel-forming position, heating the same to develop a solution of the parts at and between adjacently arranged portions thereof whereby to integrate the parts, at said portions, while simultaneously generating, within said hollow vessel, a gaseous atmosphere at a pressure greater than that prevailing outside of the hollow vessel, said atmosphere being adapted to inhibit oxidation of said parts during the formation of the solution therebetween, and also providing for the escape of said generated atmosphere, from the vessel, at a rate sufficient to prevent gas pressure within the vessel from becoming great enough to disturb the integrated portions during the formation of said solution.

4. The method of forming hollow vessels by joining a plurality of parts, which comprises arranging the parts in vessel-forming position, heating the same to develop a solution of the parts at and between adjacently arranged portions thereof whereby to integrate the parts, at said portions, while generating, within said hollow vessel, a gaseous atmosphere at a pressure greater than that prevailing outside of the hollow vessel, said atmosphere being adapted to inhibit oxidation of the material of said parts during the formation of the solution therebetween, and also providing for the escape of said generated atmosphere, from the vessel, at a rate such as to maintain, at all times, during the formation of the solution, a sufficient quantity of the generated atmosphere to prevent entrance into the vessel of gaseous media capable of oxidizing the materials entering said solution.

5. The method of forming hollow vessels by joining a plurality of parts, which comprises arranging the parts in vessel-forming position, heating the same to develop a solution of the parts at and between adjacently arranged portions thereof whereby to integrate the parts, at said portions, while generating, within said hollow vessel, a gaseous atmosphere at a pressure greater than that prevailing outside of the hollow vessel, said atmosphere being adapted to inhibit oxidation of the material of said parts during the formation of the solution therebetween, and also providing for the regulated escape of said generated atmosphere from the vessel at a rate sufficient to prevent gas pressure, within the vessel, from becoming great enough to disturb the integrated portions during the formation of said solution, while maintaining in the vessel, at all times during the formation of the solution, a sufficient quantity of the generated atmosphere to prevent entrance into the vessel of gaseous media capable of oxidizing the materials entering said solution.

6. The method of forming hollow vessels by joining a plurality of parts, which comprises assembling the parts in vessel forming position with portions of said parts in engagement in position to form seams, introducing into the vessel a material adapted, when heated, to produce a vapor within the vessel capable of excluding oxygen therefrom and from said seams, and then heating the vessel in order to vaporize the material and to integrate the engaging portions of said parts by developing a solution of the material of the parts between said engaging portions in the vaporous atmosphere formed by the vaporization of said material whereby to inhibit oxidation of said solution during the formation of said joint.

7. The method of forming hollow vessels by joining a plurality of parts, which comprises assembling the parts in vessel-forming position with co-operating portions of said parts in co-operating position to form seams, introducing, between said co-operating portions, a material adapted to form a solution with the material of said co-operating portions and also at least partially evaporable to produce a gaseous atmosphere at a pressure greater than that prevailing outside of the hollow vessel, said atmosphere being within the vessel and in position to blanket the co-operating parts and the remainder of said material in order to inhibit oxidation of the solution during the formation of the joint.

8. The method of forming hollow vessels by joining a plurality of parts comprising material adapted to alloy with zinc, which consists in assembling the parts in vessel-forming position with co-operating portions of said parts in co-operating position to form seams, introducing a bonding material comprising zinc between said co-operating portions, introducing zinc within said vessel, and then heating the vessel in order to vaporize the zinc within the vessel and to integrate the co-operating portions of said parts by developing a solution of the material of the parts with the zinc interposed therebetween, said solution being blanketed by the zinc vapor produced by the vaporization of said zinc within the vessel whereby to inhibit oxidation of said solution during the formation of said joint.

9. The method of forming hollow vessels by joining a plurality of parts comprising material adapted to alloy with another material, which consists in assembling the parts in vessel-forming position, with co-operating portions of said parts in co-operating position to form seams, introducing a bonding strip, comprising said other material, between said co-operating portions, introducing a predetermined quantity of said other material within said vessel and then heating the vessel in order to vaporize the material thus introduced in the vessel and to integrate said co-operating portions by developing a solution of the material of the portions with the material of the bonding strip interposed therebetween, said solution being blanketed by the vapor produced by the evaporation of the material within the vessel in order to inhibit oxidation of said solution during the forming of said joint.

10. The method of forming a joint between elements comprising material adapted to alloy with zinc, which comprises interposing a bonding material comprising zinc between co-operating seam-forming portions of said elements and heating to evaporate material adapted to provide an oxygen-excluding atmosphere at a pressure greater than that prevailing outside of the hollow vessel, said atmosphere comprising an excess of zinc vapor in position blanketing said joint, and, at the same time, to permit the material of said co-operating portions to form a solution with the bonding material therebetween.

11. The method of forming hollow vessels by joining a plurality of parts which consists in assembling the parts in vessel forming position with co-operating portions of said parts in position to form seams, introducing a predetermined quantity of zinc within said vessel and then heating the vessel in order to integrate the co-operating portions of said parts to form a seam by developing a solution of the material of the parts therebetween and to vaporize the zinc within the vessel under pressure to blanket the seam-forming portions, whereby to inhibit oxidation thereof during the formation of said seam.

12. The method of forming hollow vessels by joining a plurality of parts which consists in assembling the parts in vessel-forming position with co-operating portions of said parts in position to form seams, introducing within said vessel a material adapted when heated to vaporize and develop an atmosphere adapted to inhibit oxidation, thereafter heating the vessel in order to integrate the co-operating portions of said parts by developing a solution of the material thereof therebetween, and simultaneously to vaporize the material within the vessel to produce gaseous atmosphere under pressure in position to blanket the co-operating portions and thereby inhibit oxidation thereof during the formation of the seam.

ROBERT G. GUTHRIE.